(12) United States Patent
Wobak et al.

(10) Patent No.: US 11,037,435 B2
(45) Date of Patent: Jun. 15, 2021

(54) RADIO FREQUENCY COMMUNICATION DEVICE

(71) Applicant: NXP B.V., Eindhoven (NL)

(72) Inventors: Markus Wobak, Graz (AT); Stefan Tretnjak, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/687,491

(22) Filed: Nov. 18, 2019

(65) Prior Publication Data
US 2021/0150882 A1 May 20, 2021

(51) Int. Cl.
*G08B 29/18* (2006.01)
*H04Q 9/02* (2006.01)
*G08B 21/18* (2006.01)

(52) U.S. Cl.
CPC ......... *G08B 29/185* (2013.01); *G08B 21/182* (2013.01); *H04Q 9/02* (2013.01); *H04Q 2209/47* (2013.01)

(58) Field of Classification Search
CPC ...... G08B 29/185; G08B 21/182; H04Q 9/02; H04Q 2209/47
See application file for complete search history.

(56) References Cited

U.S. PATENT DOCUMENTS

| | | | |
|---|---|---|---|
| 7,208,916 B1 * | 4/2007 | Boatwright | H01M 10/486 320/150 |
| 10,522,027 B1 * | 12/2019 | Conner | H01M 10/486 |
| 10,685,326 B1 * | 6/2020 | Ewing | G06K 7/10366 |
| 2005/0248438 A1 * | 11/2005 | Hughes | G06K 19/0717 340/10.4 |

(Continued)

FOREIGN PATENT DOCUMENTS

EP 3681103 A1 7/2020

OTHER PUBLICATIONS

"AN11145 CLRC663, MFRC631, MFRC 630, SLRC610 Low Power Card Detection—Rev. 2.0 223720—Application Note", NXP Semiconductors, 26 pgs., retrieved from the Internet at: https://www.nxp.com/docs/en/application-note/AN11145.pdf (May 4, 2015).

(Continued)

*Primary Examiner* — Daryl C Pope
(74) *Attorney, Agent, or Firm* — Shuqian Yan (57) ABSTRACT

A communication device includes a main controller configured to control an RF communication of the communication device, and an antenna coupled to the main controller and driven by the main controller with modulated carrier signal. The communication device includes a detector coupled to the main controller and configured to detect a presence of an external communication device and to initiate a wake-up of the main controller in response to the detection. The communication device further includes one or more temperature sensors coupled to the detector and configured to detect temperature information of external or nearby circuits of the communication device. The detector is configured not to initiate the wake-up of the main controller if a difference between a first temperature measurement and a second temperature measurement is above a first temperature threshold or below a second temperature threshold.

18 Claims, 8 Drawing Sheets

(56) References Cited

U.S. PATENT DOCUMENTS

| | | | |
|---|---|---|---|
| 2014/0028377 A1* | 1/2014 | Rosik | G05F 3/02 |
| | | | 327/513 |
| 2014/0085057 A1 | 3/2014 | Horst et al. | |
| 2014/0277308 A1* | 9/2014 | Cronise | A61F 7/00 |
| | | | 607/112 |
| 2017/0177065 A1* | 6/2017 | Rajwan | G06F 1/3296 |
| 2017/0215145 A1* | 7/2017 | Solotke | H04W 52/0235 |
| 2017/0332235 A1* | 11/2017 | Smith | H04W 52/0225 |
| 2021/0027244 A1* | 1/2021 | Ewing | G06Q 10/0875 |

OTHER PUBLICATIONS

"AN11785 PN7462AU LPCD and Standby mode Rev. 1.0 358410—Application Note", NXP Semiconductors, 10 pgs., retrieved from the Internet at: https://www.nxp.com/docs/en/application-note/AN11785.pdf (Mar. 9, 2016).

* cited by examiner

RADIO FREQUENCY COMMUNICATION DEVICE

The present disclosure generally relates to contactless communication, and more particularly to a radio frequency (RF) communication device.

Radio frequency (RF) communication devices are widely used. Examples of RF communication devices are near field communication (NFC) devices and radio frequency identification (RFID) devices. Typically, an NFC system or an RFID system includes a primary Near Field Communication (NFC) device or a Radio Frequency Identification (RFID) reader that generates a high-frequency RF field to communicate with a passive or active communication counterpart. The communication counterpart may be a passive transponder or an active card emulation device. Modulation schemes and signal coding are applied for the communication between the devices. Specific implementation examples are described, inter alia, in the technical standards issued by the NFC Forum, and in the technical standards ISO/IEC 14443, ISO/IEC 15693, ISO/IEC 18092, ISO/IEC18000.

A primary NFC device or an RFID reader normally enables its RF field and polls for counterparts in all different communication technologies (such as NFC-A, NFC-B, NFC-F, NFC-V) to detect communication counterparts. However, this is not efficient for battery-powered devices (e.g., mobile devices, wearables, door lock readers) because it reduces device availability due to power limitations. A technique called Low Power Card Detection (LPCD) may be applied to detect the possible presence of a communications counterpart by only sending short RF sense pulses to detect load changes at the RF interface of the primary device or the reader. This allows the primary device or the reader to reduce its RF field ON-duration and to switch to a power-saving state between the sense pulses (e.g., to enter a current-saving standby mode). Low Power Card Detection (LPCD) may also be referred to as Low Power Device Detection (LPDD) to indicate that both active and passive devices are detectable using the low power detection technique. In other words, the low-power detection techniques as described herein may not only be applied to systems in which physical or virtual smart cards should be detected, for example, but also to systems in which other types of devices should be detected, for example radio frequency identification (RFID) tags or near field communication (NFC) tags.

Figure 1:
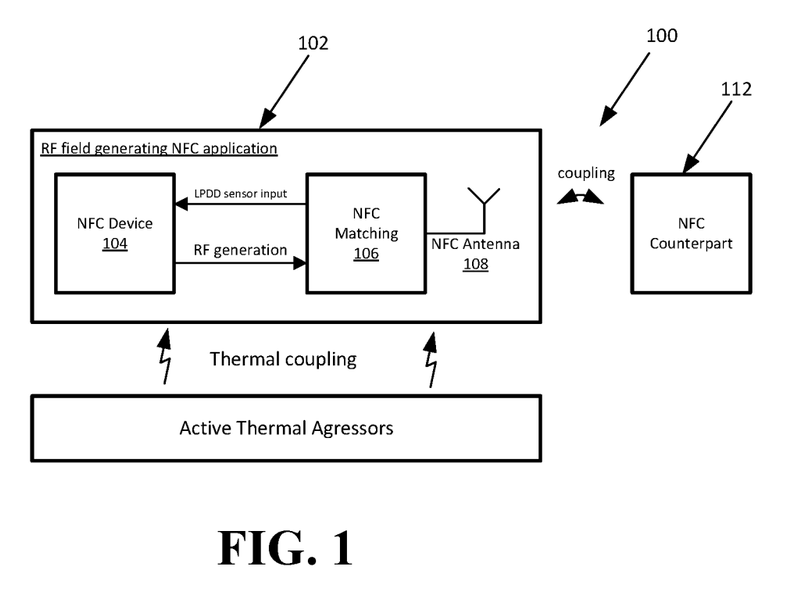
FIG. 1 is an example NFC communication system.

FIG. 1 shows an example of an NFC system 100. System 100 comprises a primary device 102 and a communication counterpart 112. The primary device comprises an NFC device 104 operatively coupled to an NFC matching circuit 106 and an NFC antenna 108. In a basic LPDD implementation, the NFC device receives one (or more) LPDD sensor inputs and detects LPDD metric changes (e.g., voltage and/or current changes) caused by a counterpart device approaching the NFC antenna. An LPDD algorithm may be implemented to compare instantaneous polling measurements with a reference measurement. A full NFC discovery is triggered if the instantaneous measurement differs from the reference measurement at least by more than a (configurable) threshold value.

Figure 1A:
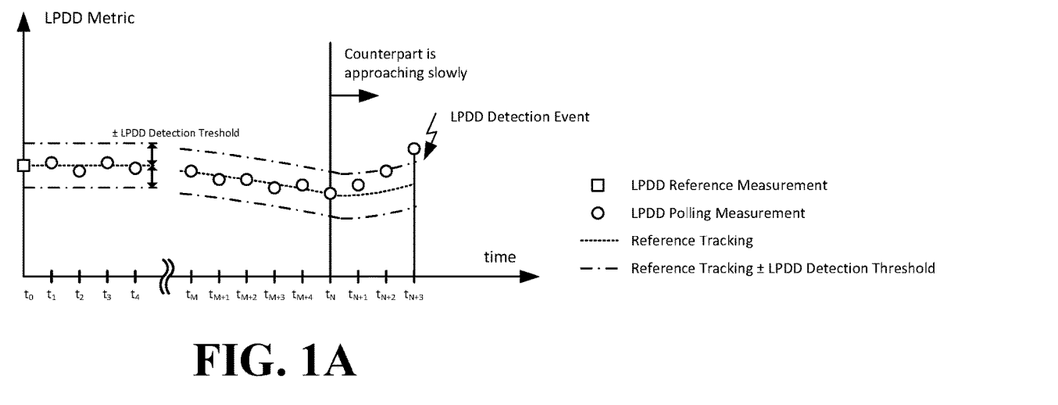
FIGS. 1A-1B illustrate an LPDD implementation.
Figure 1B:
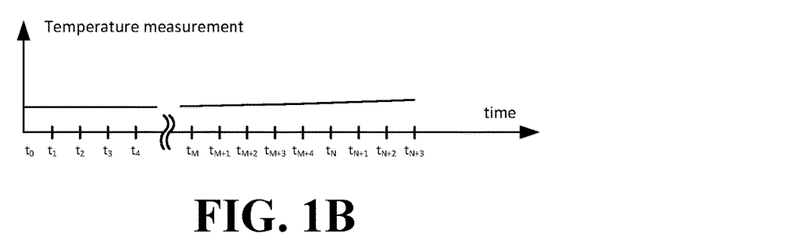

FIGS. 1A-1B illustrate an LPDD implementation. As shown in FIG. 1A, at time index $t_N$, a counterpart device is slowly approaching. Consequently, a full NFC discovery or an LPDD detection event is triggered at time index $t_{N+3}$ when the instantaneous LPDD polling measurement differs from the reference measurement by more than the LPDD detection threshold value. In this scenario, no significant temperature change event was observed according to the temperature measurements shown FIG. 1B.

However, some customer system implementations, e.g., mobile devices like mobile phones or wearables, have shown that thermal coupling of external and/or nearby circuitry caused by active thermal aggressors can affect the LPDD sensor data measurement, which causes the LPDD sensor sense a significant LPDD metric change as if a counterpart device is approaching the NFC antenna. As such, an LPDD false alarm is triggered resulting in increased battery consumption and degraded user experience.

Figure 1C:
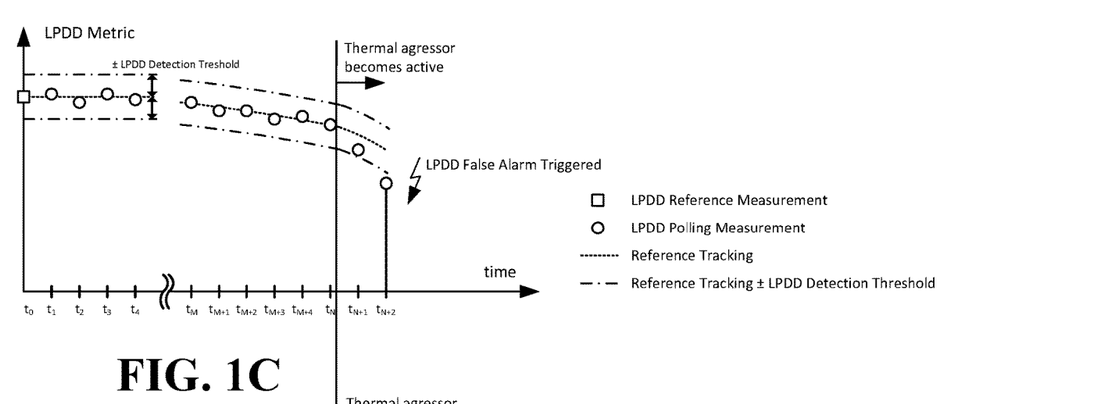
FIGS. 1C-1D illustrate an LPDD false alarm event of an LPDD implementation being exposed to thermal aggressors.
Figure 1D:
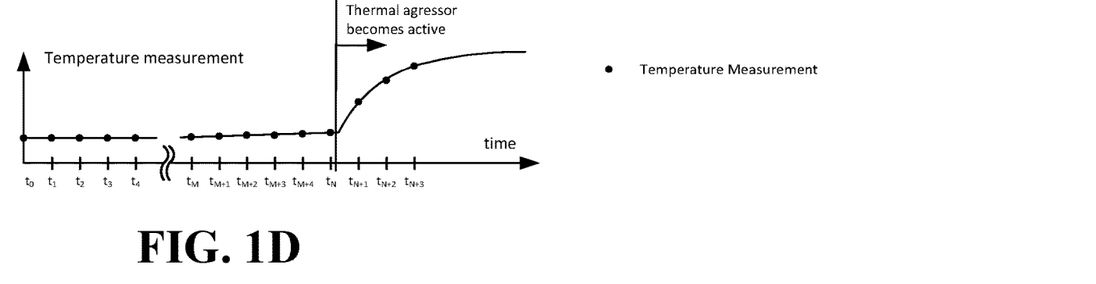

FIGS. 1C-1D illustrate an LPDD false alarm event of an LPDD implementation being exposed to thermal aggressors. This scenario assumes an unloaded condition, i.e., no tag or counterpart communication device is approaching. As shown in FIG. 1D, after time index $t_N$, one or more thermal aggressors have become active causing a rapid temperature increase at time index $t_{N+1}$, $t_{N+2}$, $t_{N+3}$. Consequently, as show in FIG. 1C, at time index $t_{N+2}$ when the instantaneous LPDD polling measurement differs from the reference measurement by more than the LPDD detection threshold value, an LPDD false alarm is triggered as if a counterpart device is approaching. In this example, the relevant temperature information due to these active thermal aggressors was not considered.

SUMMARY

A communication device includes a main controller configured to control an RF communication of the communication device, an antenna coupled to said main controller and driven by said main controller with modulated carrier signal, a detector coupled to said main controller and configured to detect a presence of an external communication device and to initiate a wake-up of said main controller in response to said detection, and one or more temperature sensors coupled to said detector and configured to detect temperature information of external or nearby circuits of the communication device. The detector is configured to detect said presence by detecting a load on an RF interface of the communication device. The detector is configured not to initiate said wake-up of said main controller if a difference between a first temperature measurement and a second temperature measurement is above a first temperature threshold or below a second temperature threshold. The detector is configured to initiate said wake-up of said main controller if a difference between said load and a reference load is above a detection threshold and said difference between said first temperature measurement and said second temperature measurement is less than said first temperature threshold and greater than said second temperature threshold.

In one embodiment, the first temperature threshold is a positive value, and the second temperature threshold is a negative value.

In one embodiment, the detector is configured not to initiate said wake-up of said main controller includes increasing said detection threshold by a first scaling factor if said difference between said first temperature measurement and said second temperature measurement is above said first temperature threshold.

In one embodiment, the detector is configured not to initiate said wake-up of said main controller includes increasing said detection threshold by a second scaling factor if said difference between said first temperature measurement and said second temperature measurement is below said second temperature threshold.

In one embodiment, the communication device includes a non-volatile random-access memory (NVRAM) or a flash memory for storing one or more configuration parameters.

In one embodiment, the detector is configured not to initiate said wake-up of said main controller includes detecting a strong temperature increase event if said difference between said first temperature measurement and said second temperature measurement is above said first temperature threshold.

In one embodiment, the detector is configured not to initiate said wake-up of said main controller includes detecting a strong temperature decrease event if said difference between said first temperature measurement and said second temperature measurement is below said second temperature threshold.

In one embodiment, said communication device is a near field communication, (NFC) device, a radio frequency identification (RFID) device, a mobile device, or a wearable device.

A method includes detecting a load on an RF interface of a communication device, detecting temperature information of external or nearby circuits of the communication device, determining whether to initiate a wake-up of a main controller of the communication device in response to said detecting said load and said temperature information, preventing said wake-up of said main controller if a difference between a first temperature measurement and a second temperature measurement is above a first temperature threshold or below a second temperature threshold, and initiating said wake-up of said main controller if a difference between said load and a reference load is above a detection threshold and said difference between said first temperature measurement and said second temperature measurement is less than said first temperature threshold and greater than said second temperature threshold.

A communication device includes a main controller configured to control an RF communication of the communication device, an antenna coupled to said main controller and driven by said main controller with modulated carrier signal, a detector coupled to said main controller and configured to detect a presence of an external communication device and to initiate a wake-up of said main controller in response to said detection, one or more temperature sensors configured to detect temperature information of external or nearby circuits of the communication device, and a temperature compensation tracking module coupled to said one or more temperature sensors and configured to determine an error caused by a temperature change in response to said temperature information. The detector is configured to detect said presence by detecting a first load on an RF interface of the communication device and deriving a second load by subtracting said error from said first load. The detector is configured to initiate said wake-up of said main controller if a difference between said second load and a reference is above a detection threshold.

The above discussion is not intended to represent every example embodiment or every implementation within the scope of the current or future Claim sets.

Various example embodiments may be more completely understood in consideration of the following Detailed Description in connection with the accompanying Drawings.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

DETAILED DESCRIPTION

Figure 2:
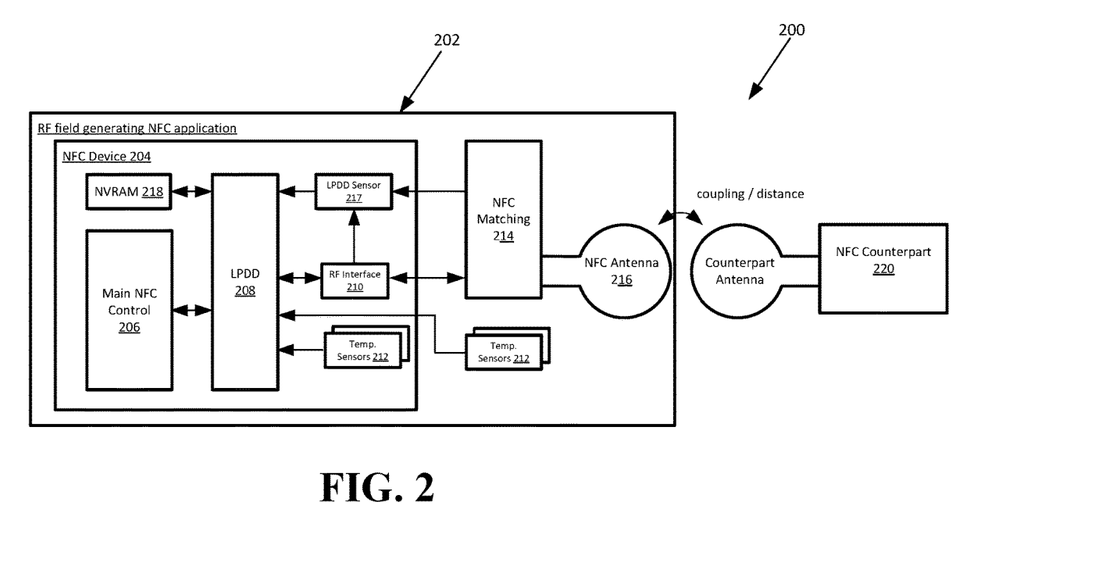
FIG. 2 is one embodiment of an example NFC communication system.

FIG. 2 shows an example of an NFC system 200. NFC system 200 comprises a primary device 202 and a communication counterpart 220. The primary device 202 comprises an NFC device 204 operatively coupled to an NFC matching circuit 214 and an NFC antenna 216. The NFC device 204 includes a main NFC controller 206 and an LPDD controller 208. LPDD controller 208 may be based on software and/or on a hardware state machine. An extended LPDD algorithm may be implemented for the LPDD controller to control LPDD operations during thermal triggered events. The extended LPDD algorithm will be discussed in more detail below.

In a typical LPDD operation, the NFC device 204 emits a short RF pulse through an RF interface 210 and senses load information from the RF interface (e.g., a transmitter current) or from the NFC matching circuit 214 by means of one or more LPDD sensors 217 (e.g., a receiver voltage or antenna voltage). The LPDD algorithm often compares the sensed result of LPDD pulses with an initial reference measurement (i.e., an initial load value). In case of detecting a load change larger than a configured LPDD detection threshold, the LPDD controller triggers a wake up (WKUP) by transmitting a wake-up signal to the main NFC controller. A full NFC discovery is therefore triggered.

The reference measurement, the LPDD detection threshold, the temperature detection thresholds, and further parameters used by the LPDD algorithm may be saved in a non-volatile random-access memory (NVRAM) or in a flash memory.

As described previously, thermal coupling of external and/or nearby circuitry existed in an NFC system (such as the NFC system of FIG. 2) may cause the LPDD sensors sense a significant LPDD metric change as if a counterpart device is approaching the NFC antenna. As a result, an LPDD false alarm is triggered resulting in increased battery consumption and degraded user experience.

As depicted in FIG. 2, one or more temperature sensors 212 are used to sense the temperature information of external and/or nearby circuitry of the NFC device. The sensed temperature information is then provided to the LPDD controller. Based on the sensed temperature information, an extended LPDD algorithm implemented for the LPDD controller can determine if it is a true LPDD detection event due to an approaching counterpart device or it is a false LPDD alarm due to active thermal aggressors (and thus no false alarm is triggered).

Figure 3:
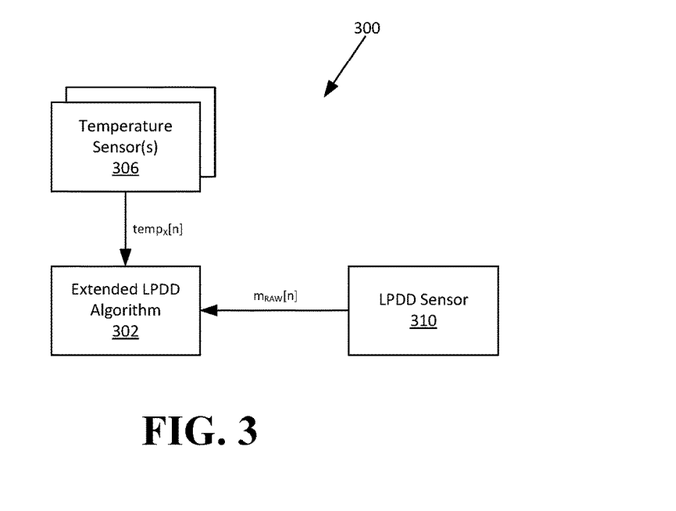
FIG. 3 is one embodiment of an example LPDD control system.

FIG. 3 is an example LPDD control system 300. LPDD control system 300 may be implemented for the NFC system of FIG. 2 to control LPDD operations during thermal triggered events.

As depicted in FIG. 3, the LPDD control system includes an extended LPDD algorithm 302, one or more temperature sensors 306, and an LPDD sensor 310. The one or more temperature sensors are used to sense the temperature information $temp_x[n]$ of external and/or nearby circuitry of the NFC device and provide such temperature information to the extended LPDD algorithm ("n" refers to the temperature measurement data measured at time index n). The LPDD sensor measures LPDD metric (e.g., voltage and/or current) and provides the LPDD metric data to the LPDD algorithm ($m_{RAW}[n]$ refers to the raw or uncorrected LPDD metric data measured by the LPDD sensor at time index n).

Figure 5:
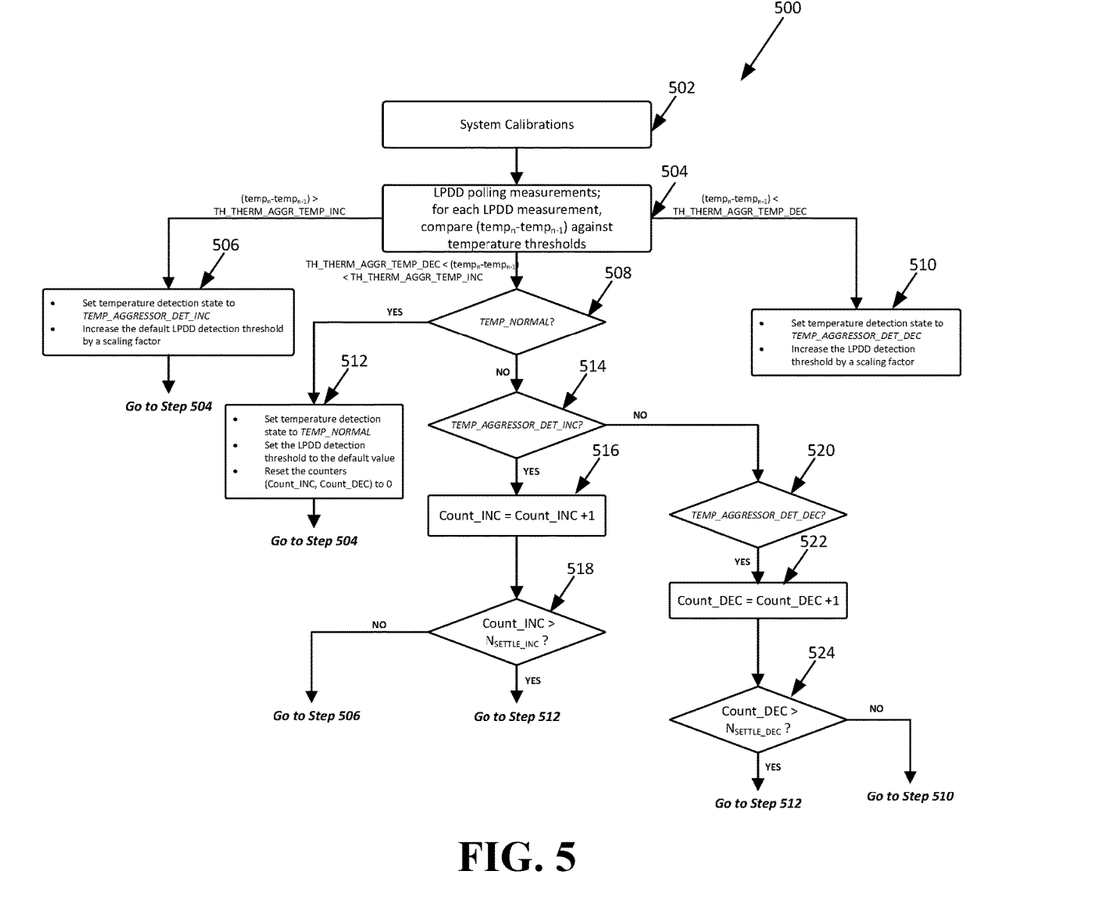
FIG. 5 is a flow diagram illustrating the extended LPDD algorithm of FIG. 3.

Based on the sensed temperature information and the raw LPDD metric, the extended LPDD algorithm determines if it is a true LPDD detection event due to an approaching counterpart device or it is a false LPDD alarm due to active thermal aggressors (and thus no false alarm is triggered). FIG. 5 below illustrates a flow diagram of the extended LPDD algorithm.

As explained above, one or more temperature sensors may be used to sense the temperature information of external and/or nearby circuitry of an NFC device, e.g., the NFC device of FIG. 2. In particular, for each LPDD poll measurement measured at time index n, a temperature sensor value $temp_n$ is observed and compared to the last temperature value $temp_{n-1}$ at time index n−1. Table 1 below defines the temperature detection states.

TABLE 1

| Temperature Detection State | Description |
| --- | --- |
| TEMP_NORMAL | In this state, no significant temperature change has been observed, and the system is performing normal LPDD operation. |
| TEMP_AGGRESSOR_DET_INC | In this state, a "strong temperature increase event" (as defined below) is detected. The LPDD detection threshold is increased to prevent false alarm from being triggered due to active thermal aggressors. The system remains in this state for a configurable amount of time, i.e., $N_{SETTLE\_INC}$ consecutive samples with no significant temperature change observed. After the $N_{SETTLE\_INC}$ is completed and no significant temperature change is observed, the temperature detection state is transitioned back to TEMP_NORMAL. |
| TEMP_AGGRESSOR_DET_DEC | In this state, a "strong temperature decrease event" (as defined below) has been detected. The LPDD detection threshold is increased to prevent false alarm from being triggered due to active thermal |

TABLE 1-continued

| Temperature Detection State | Description |
| --- | --- |
| | aggressors. The system remains in this state for a configurable amount of time, i.e., $N_{SETTLE\_DEC}$ consecutive samples with no significant temperature change observed. After the $N_{SETTLE\_DEC}$ is completed and no significant temperature change is observed, the temperature detection state is transitioned back to TEMP_NORMAL. |

The following defines "strong temperature increase event" and "strong temperature decrease event."

A "strong temperature increase event" is detected if the difference between the present temperature measurement and the last temperature measurement is greater than a configurable detection threshold TH_THERM_AGGR_TEMP_INC. That is, $(temp_n - temp_{n-1}) > TH\_THERM\_AGGR\_TEMP\_INC$ A "strong temperature decrease event" is detected if the difference between the present temperature measurement and the last temperature measurement is less than a configurable detection threshold TH_THERM_AGGR_TEMP_DEC. That is, $(temp_n - temp_{n-1}) < TH\_THERM\_AGGR\_TEMP\_DEC$ The temperature detection thresholds (TH_THERM_AGGR_TEMP_DEC, TH_THERM_AGGR_TEMP_INC) may be configured depending on various factors, e.g., thermal aggressors strength, LPDD detection sensitivity, reference tracking length, etc. It should be noted that these temperature detection thresholds are chosen such that, $TH\_THERM\_AGGR\_TEMP\_DEC < 0 < TH\_THERM\_AGGR\_TEMP\_INC$ FIG. 4A is one embodiment of an example LPDD temperature detection state transition diagram.

Figure 4A:
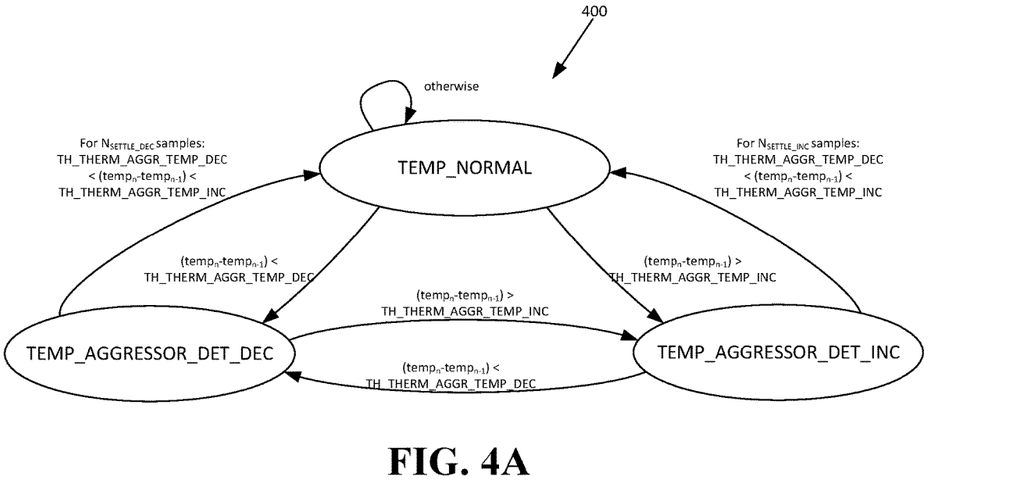
FIG. 4A is one embodiment of an example LPDD temperature detection state transition diagram.

As depicted in FIG. 4A, if there is no strong temperature change observed, i.e., no active thermal aggressors causing strong temperature increase or decrease events as defined above, or in other words, if the difference between the present temperature measurement at time index n and the previous temperature measurement at time index n−1 is TH_THERM_AGGR_TEMP_DEC<$(temp_n - temp_{n-1})$<TH_THERM_AGGR_TEMP_INC, the system is in the TEMP_NORMAL state. The system performs normal LPDD in this state.

However, the system is switched to the TEMP_AGGRESSOR_DET_INC state if a "strong temperature increase event" is detected. That is, if the difference between the present temperature measurement at time index n and the last temperature measurement at time index n−1 is greater than the temperature detection threshold TH_THERM_AGGR_TEMP_INC, the system is switched to the TEMP_AGGRESSOR_DET_INC state. The LPDD detection threshold is increased by a scaling factor (e.g., a scale factor of 4) to prevent LPDD false alarm from being triggered. The system remains in this state as long as the difference between the current temperature measurement and the previous temperature measurement is greater than the temperature detection threshold TH_THERM_AGGR_TEMP_INC for each subsequent temperature measurement. At a certain point in time when a next LPDD poll measurement and temperature measurement is taken, if it is detected that the difference between the present temperature measurement and the previous temperature measurement is TH_THERM_AGGR_TEMP_DEC<$(temp_n - temp_{n-1})$<TH_THERM_AGGR_

TEMP_INC, the system remains in the TEMP_AGGRESSOR_DET_INC state for a configurable amount of time, i.e., $N_{SETTLE\_INC}$ consecutive samples. Only after the $N_{SETTLE\_INC}$ is completed and there is no significant temperature change observed, the temperature state is switched back to TEMP_NORMAL.

On the other hand, the system is transitioned from the TEMP_NORMAL state to the TEMP_AGGRESSOR_DET_DEC state if a "strong temperature decrease event" is detected. That is, if the difference between the present temperature measurement at time index n and the last temperature measurement at time index n−1 is less than the temperature detection threshold TH_THERM_AGGR_TEMP_DEC, the system is switched to the TEMP_AGGRESSOR_DET_DEC state. The LPDD detection threshold is increased by a scaling factor (e.g., a scale factor of 2) to prevent LPDD false alarm from being triggered due to the strong temperature decrease event. The system remains in this state as long as the difference between the present temperature measurement and the last temperature measurement is less than the temperature detection threshold TH_THERM_AGGR_TEMP_DEC for each subsequent temperature measurement. At a certain point in time when a next LPDD poll measurement and temperature measurement is taken, if it is detected that the difference between the present temperature measurement and the previous temperature measurement is TH_THERM_AGGR_TEMP_DEC<$(temp_n-temp_{n-1})$<TH_THERM_AGGR_TEMP_INC, the system will remain in the TEMP_AGGRESSOR_DET_DEC state for a configurable amount of time, i.e., $N_{SETTLE\_DEC}$ consecutive samples. Only after the $N_{SETTLE\_DEC}$ is completed and there is no significant temperature change observed, the temperature state is switched back to TEMP_NORMAL.

Furthermore, the system is transitioned from the TEMP_AGGRESSOR_DET_DEC state to the TEMP_AGGRESSOR_DET_INC state if $(temp_n-temp_{n-1})$>TH_THERM_AGGR_TEMP_INC, and from the TEMP_AGGRESSOR_DET_INC state to the TEMP_AGGRESSOR_DET_DEC if $(temp_n-temp_{n-1})$<TH_THERM_AGGR_TEMP_DEC.

Figure 4B:
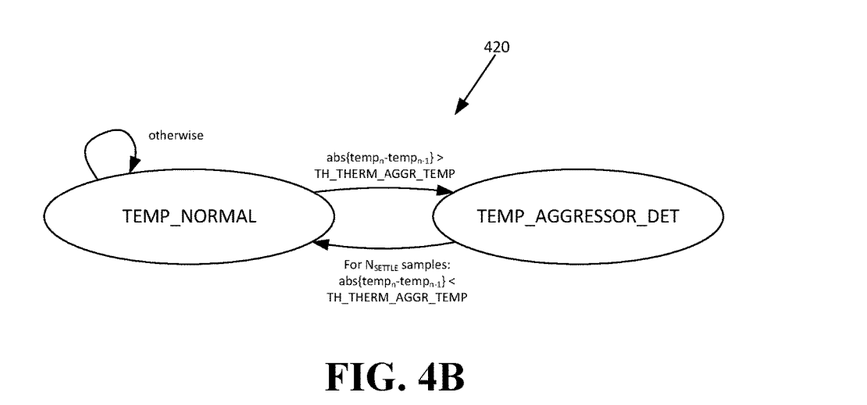
FIG. 4B is another embodiment of an example LPDD temperature detection state transition diagram.

FIG. 4B is another embodiment of an example LPDD temperature detection state transition diagram. Here, the absolute temperature change is observed (Abs($temp_n-temp_{n-1}$)) and compared with a temperature detection threshold (TH_THERM_AGGR_TEMP). In particular, the system is in the TEMP_NORMAL state if Abs ($temp_n-temp_{n-1}$)<TH_THERM_AGGR_TEMP. The system is switched to the TEMP_AGGRESSOR_DET state if Abs $(temp_n-temp_{n-1})$>TH_THERM_AGGR_TEMP. The LPDD detection threshold is increased by a scaling factor (e.g., a scale factor of 2) to prevent LPDD false alarm from being triggered due to the strong temperature change. The system remains in this state as long as Abs($temp_n-temp_{n-1}$)>TH_THERM_AGGR_TEMP.

At a certain point in time when a subsequent LPDD poll measurement is taken, if it is detected that Abs ($temp_n-temp_{n-1}$)<TH_THERM_AGGR_TEMP, the system will remain in the TEMP_AGGRESSOR_DET state for a configurable amount of time, i.e., $N_{SETTLE}$ consecutive samples. Only after the $N_{SETTLE}$ is completed and there is no significant temperature change observed, the temperature state is switched back to TEMP_NORMAL.

FIG. 5 illustrates a flow diagram 500 of the extended LPDD algorithm of FIG. 3.

At 502, system calibrations are performed. This may include operating point definition, reference measurement, etc. In particular, during system calibrations, the LPDD detection threshold is set to a default value, the counters (Count_INC, Count_DEC) are set to an initial value of zero, the temperature thresholds are set to their respective default values, and also the initial temperature detection state is set to TEMP_NORMAL.

At 504, LPDD polling measurements are performed. For each LPDD polling measurement at time index n, the current/present temperature measurement at time index n is compared with the temperature measurement time index n−1 and the difference of these two temperature measurements are compared against the temperature thresholds as described below.

If $(temp_n-temp_{n-1})$>TH_THERM_AGGR_TEMP_INC, at 506, the temperature detection state is set to TEMP_AGGRESSOR_DET_INC, and the default LPDD detection threshold is increased by a scaling factor (e.g., a scale factor of 4). The algorithm then returns to step 504 for the next LPDD poll measurement.

If $(temp_n-temp_{n-1})$<TH_THERM_AGGR_TEMP_DEC, at 510, the temperature detection state is set to TEMP_AGGRESSOR_DET_DEC, and the default LPDD detection threshold is increased by a scaling factor (e.g., a scale factor of 2). The algorithm then returns to step 504 for the next LPDD poll measurement.

If TH_THERM_AGGR_TEMP_DEC<$(temp_n-temp_{n-1})$<TH_THERM_AGGR_TEMP_INC, at 508, the temperature detection state is checked to determine if it is set to TEMP_NORMAL. If the checking is positive ("YES"), at 512, the temperature detection state is set to TEMP_NORMAL, the LPDD detection threshold is set to the default value, and reset the counters (Count_INC, Count_DEC) to 0. The algorithm then returns to step 504 for the next LPDD poll measurement.

Otherwise, if the temperature detection state is not set to TEMP_NORMAL, at 514, the temperature detection state is checked to determine if it is set to TEMP_AGGRESSOR_INC. If it is determined that the temperature detection state is set to TEMP_AGGRESSOR_INC, a period of $N_{SETTLE\_INC}$ consecutive samples will take place according to steps 516 and 518. As explained previously, at a certain point in time when a next LPDD poll measurement and temperature measurement is taken, if it is detected that the difference between the present temperature measurement and the previous temperature measurement is TH_THERM_AGGR_TEMP_DEC<$(temp_n-temp_{n-1})$<TH_THERM_AGGR_TEMP_INC, the system remains in the TEMP_AGGRESSOR_DET_INC state for a configurable amount of time, i.e., $N_{SETTLE\_INC}$ consecutive samples. Only after the $N_{SETTLE\_INC}$ is completed and there is no significant temperature change observed, the temperature state is switched back to TEMP_NORMAL. This is illustrated in the flow diagram according to steps 516 and 518.

Otherwise, if the temperature detection state is set to TEMP_AGGRESSOR_DEC (step 520), a period of $N_{SETTLE}$_DEC consecutive samples will take place according to steps 522 and 524. That is, and as explained previously, at a certain point in time when a next LPDD poll measurement and temperature measurement is taken, if it is detected that the difference between the present temperature measurement and the previous temperature measurement is TH_THERM_AGGR_TEMP_DEC<$(temp_n-temp_{n-1})$<TH_THERM_AGGR_TEMP_INC, the system remains in the TEMP_AGGRESSOR_DET_DEC state for a configurable amount of time, i.e., $N_{SETTLE\_DEC}$ consecutive samples. Only after the $N_{SETTLE\_DEC}$ is completed and there is no significant temperature change observed, the temperature state is switched back to TEMP_NORMAL. This is illustrated in the flow diagram according to steps 522 and 524.

Figure 6A:
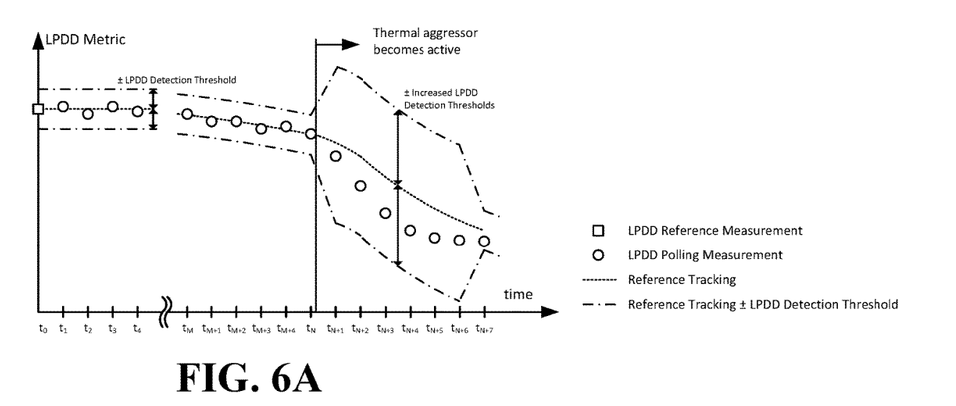
FIG. 6A-6B illustrate an LPDD implementation during a strong temperature increase event due to active thermal aggressors.
Figure 6B:
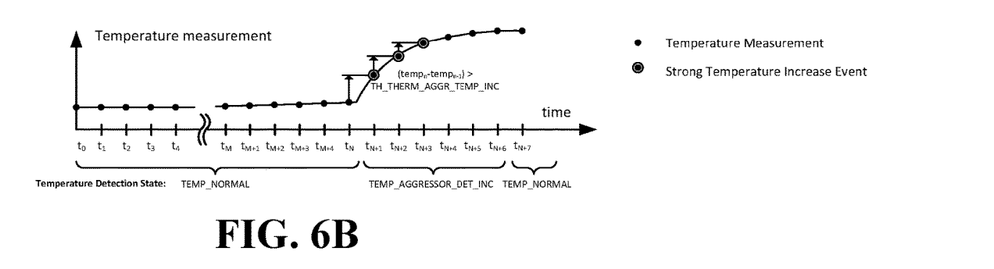

FIG. 6A-6B illustrate an LPDD implementation during a strong temperature increase event.

As depicted in FIG. 6B, there is no significant temperature change observed up to the time index $t_N$, i.e., no active thermal aggressors causing significant temperature increase or decrease event before the time index n, the temperature detection state is set to TEMP_NORMAL. As shown in FIG. 6A, the LPDD polling measurements closely follow the reference tracking up to the time index n.

As depicted in FIG. 6B, after the time index $t_N$, one or more thermal aggressors have become active causing a strong temperature increase event (as defined above) at $t_{N+1}$, $t_{N+2}$, $t_{N+3}$. Correspondingly, as shown in FIG. 6A, the LPDD polling measurements at $t_{N+1}$, $t_{N+2}$, $t_{N+3}$ no longer closely follow the reference tracking, which indicates there is a significant LPDD metric change due to active thermal aggressors.

As such, the system is transitioned from the TEMP_NORMAL state to the TEMP_AGGRESSOR_DET_INC state. The LPDD detection threshold is increased by a scaling factor (e.g., a scale factor of 4) to prevent LPDD false alarm from being triggered. The system remains in this state as long as the difference between the current temperature measurement and the previous temperature measurement is greater than the temperature detection threshold TH_THERM_AGGR_TEMP_INC at $t_{N+1}$, $t_{N+2}$, $t_{N+3}$.

After the time index $t_{N+4}$, the impact of thermal aggressors is gradually reduced such that the difference between the present temperature measurement and the previous temperature measurement is TH_THERM_AGGR_TEMP_DEC<(temp$_n$−temp$_{n-1}$)<TH_THERM_AGGR_TEMP_INC. In order to allow reference tracking saturating, the system will remain in the TEMP_AGGRESSOR_DET_INC state for $N_{SETTLE\_INC}$ consecutive samples (e.g., $N_{SETTLE\_INC}$ is set to 3 in this example). After the settling is completed, the temperature detection state is switched back to TEMP_NORMAL at the time index $t_{N+7}$.

Thus, by implementing the improved LPDD algorithm as described above, no LPDD false alarm is triggered due to active thermal aggressors causing strong temperature increases. There may be a tradeoff between LPDD detection sensitivity and false alarm robustness for a short time period after the thermal aggressors have become active.

Figure 6C:
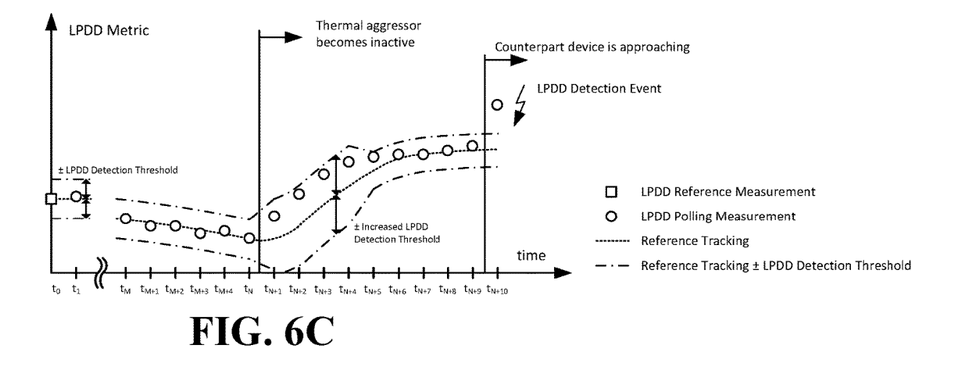
FIG. 6C-6D illustrate an LPDD implementation during a strong temperature decrease event due to active thermal aggressors.
Figure 6D:
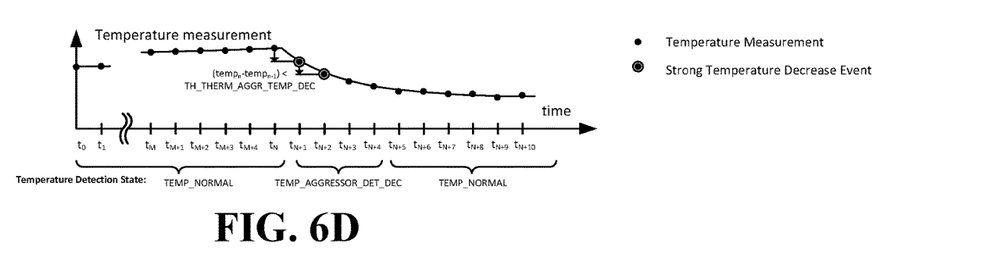

FIG. 6C-6D illustrate an LPDD implementation during a strong temperature decrease event due to active thermal aggressors.

As depicted in FIG. 6D, there is no significant temperature change observed up to the time index $t_N$, i.e., no active thermal aggressors causing strong temperature increase or decrease events before the time index n, the temperature detection state is set to TEMP_NORMAL. As shown in FIG. 6C, the LPDD polling measurements closely follow the reference tracking up to the time index n.

As depicted in FIG. 6D, after the time index $t_N$, one or more thermal aggressors have become active causing a strong temperature decrease event (as defined above) at $t_{N+1}$, $t_{N+2}$. Correspondingly, as shown in FIG. 6C, the LPDD polling measurements at $t_{N+1}$, $t_{N+2}$ no longer closely follow the reference tracking, which indicates there is a significant LPDD metric change due to the active thermal aggressors.

As such, the system is transitioned from the TEMP_NORMAL state to the TEMP_AGGRESSOR_DET_DEC state. The LPDD detection threshold is increased by a scaling factor (e.g., a scale factor of 2) to prevent LPDD false alarm from being triggered. The system remains in this state as long as the difference between the current temperature measurement and the previous temperature measurement is less than the temperature detection threshold TH_THERM_AGGR_TEMP_DEC at $t_{N+1}$, $t_{N+2}$.

After the time index $t_{N+3}$, the impact of thermal aggressors is gradually reduced such that the difference between the present temperature measurement and the previous temperature measurement is TH_THERM_AGGR_TEMP_DEC<(temp$_n$−temp$_{n-1}$)<TH_THERM_AGGR_TEMP_INC. In order to allow reference tracking saturating, the system will remain in the TEMP_AGGRESSOR_DET_DEC state for NsErLE_DEC consecutive samples (e.g., $N_{SETTLE\_DEC}$ is set to 2 in this example). After the settling is completed, the temperature detection state is switched back to TEMP_NORMAL at the time index $t_{N+5}$.

At time index $t_{N+10}$, an approaching counterpart device causes a LPDD metric change. Since there is no significant temperature increase or decrease event observed, the temperature detection state remains in TEMP_NORMAL. Here, a full NFC discovery (an LPDD detection event) is successfully triggered according to the normal LPDD implementation as described above with reference to FIGS. 1A-1B.

Thus, by implementing the improved LPDD algorithm as described above, no LPDD false alarm is triggered due to active thermal aggressors causing strong temperature decreases. There may be a tradeoff between LPDD detection sensitivity and false alarm robustness for a short time period after the thermal aggressors have become active.

Figure 7:
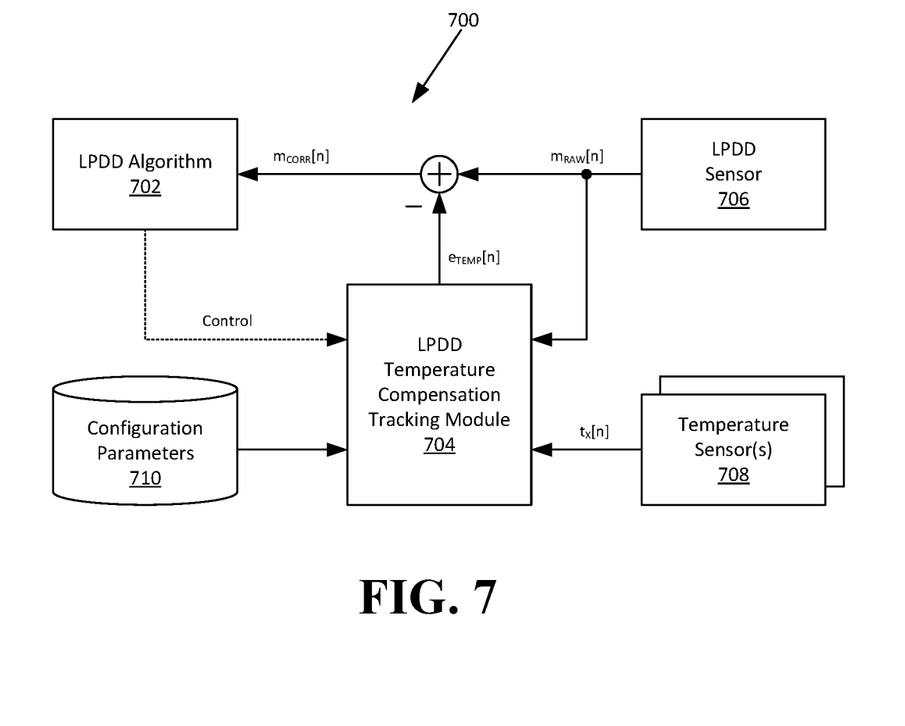
FIG. 7 is another embodiment of an example LPDD control system.

FIG. 7 is another embodiment of an example LPDD control system. LPDD control system 700 may be implemented for the NFC system of FIG. 2 to control LPDD operations during thermal triggered events. As described below, LPDD control system 700 can predict the impact of temperate changes to LPDD sensor measurements based on application specific prior knowledge. There is no tradeoff between LPDD detection sensitivity and false alarm robustness.

As depicted in FIG. 7, the LPDD control system includes an LPDD algorithm 702, an LPDD sensor 706, one or more temperature sensors 708, and an LPDD temperature compensation tracking module 704. The one or more temperature sensors are used to sense the temperature information of external and/or nearby circuitry of the NFC device and provide the temperature information temp$_X$[n] to the LPDD temperature compensation tracking module. In one embodiment, the LPDD temperature compensation tracking module includes an adaptive tracking algorithm to predict the expected/estimated LPDD measurement error $e_{TEMP}[n]$ caused by temperature changes (thermal aggressors have become active) based on current and historic LPDD measurements, current and historic temperature measurements of one or more temperature sensors, and application specific tracking parameters stored in a non-volatile memory (e.g., configuration parameters 710 as depicted in FIG. 7). In one embodiment, the LPDD temperature compensation tracking module is controlled by the LPDD algorithm. For example, the LPDD temperature compensation tracking module can be reset by the LPDD algorithm after LPDD calibration to set the initial value of $e_{TEMP}[n]$ to 0.

In one embodiment, the LPDD temperature compensation tracking module is configured to predict the estimated LPDD measurement error $e_{TEMP}[n]$ based on change of current temperature measurement $t_1[n]$ with respect to previous temperature measurements $t_1[n-X]$ and application specific weighting configuration parameters $a_X$. That is, $$e_{TEMP}[n]=e_{TEMP}[n-1]+a_1*(t_1[n]-t_1[n-1])+a_2*(t_1[n]-t_1[n-2])+\ldots+a_N*(t_1[n]-t_1[n-N])$$

As depicted in FIG. 7, the estimated LPDD measurement error $e_{TEMP}[n]$ is subtracted from the uncorrected or raw LPDD measurement $m_{RAW}[n]$ to yield a corrected LPDD measurement $m_{CORR}[n]$, which is then provided to the LPDD algorithm. As a result, the LPDD algorithm performance will not be degraded due to any temperature changes.

Thus, the LPDD control system is able to predict and compensate the impact of thermal aggressors on LPDD sensor measurements based on temperature sensor measurement(s) and application specific pre-stored knowledge. This prevents false alarms caused by temperature aggressors while maintaining LPDD detection sensitivity performance.

Figure 8A:
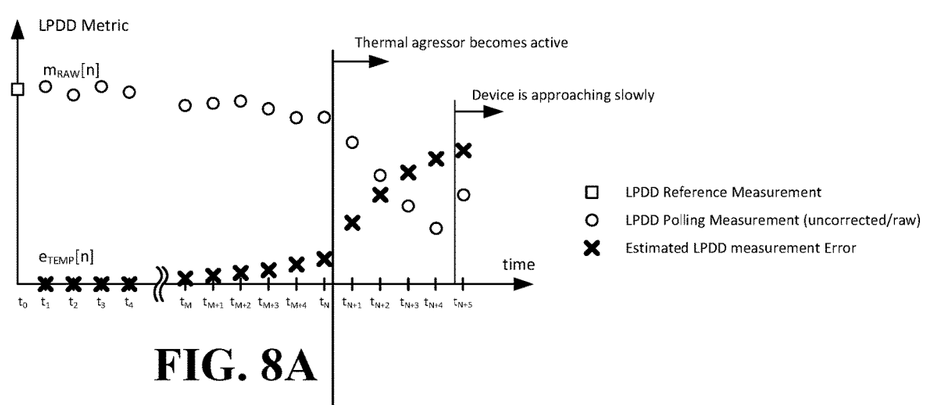
FIG. 8A-8C illustrate an LPDD implementation using the above-described adaptive tracking mechanism to predict the expected/estimated LPDD measurement error $e_{TEMP}[n]$ caused by temperature changes during a strong temperature increase event.
Figure 8B:
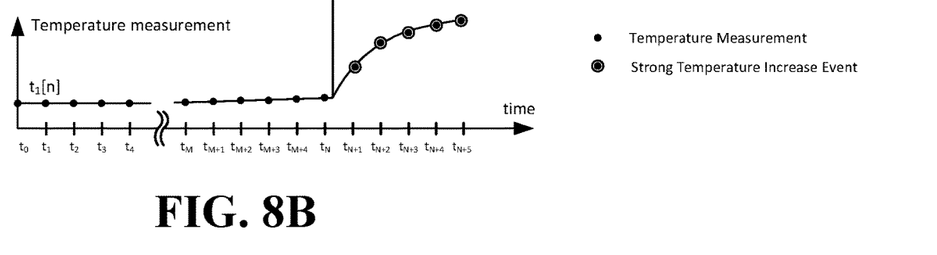
Figure 8C:
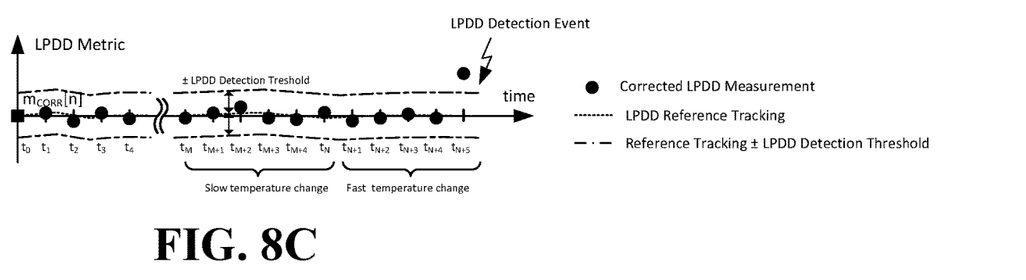

FIG. 8A-8C illustrate an LPDD implementation using the above-described adaptive tracking mechanism to predict the expected/estimated LPDD measurement error $e_{TEMP}[n]$ caused by temperature changes during a strong temperature increase event.

As depicted in FIG. 8B, the temperature measurements did not change much until the time index $t_N$. However, as thermal aggressors have become active at around time index $t_N$, a strong temperature increase event occurs at time indexes $t_{N+1}$, $t_{N+2}$, $t_{N+3}$, $t_{N+4}$ causing a strong change in the LPDD measurement metric from the reference measurement. An estimated LPDD measurement error $e_{TEMP}[n]$ caused by the strong temperature increase events is estimated using the equation described above. The estimated LPDD measurement error $e_{TEMP}[n]$ is then subtracted from the uncorrected or raw LPDD measurement $m_{RAW}[n]$ to yield a corrected LPDD measurement $m_{CORR}[n]$. The corrected LPDD measurement $m_{CORR}[n]$ is provided to the LPDD algorithm and compared with the LPDD reference measurement to determine if a counterpart device is approaching, and thus triggering an LPDD detection event. Also, no LPDD false alarm is triggered at time indexes $t_{N+1}$, $t_{N+2}$, $t_{N+3}$, $t_{N+4}$ despite of strong temperature increase events.

At time instance $t_{N+5}$, an external counterpart device is approaching slowly causing the instantaneous LPDD polling measurement differs from the reference measurement by more than the LPDD detection threshold value. Consequently, a full NFC discovery or an LPDD detection event is triggered at time index $t_{N+5}$. Here, the LPDD metric change is caused by an approaching counterpart device and not caused by any temperature changes.

In this example implementation, no LPDD false alarm is triggered and approaching counterpart device is successfully detected. Therefore, there is no tradeoff between LPDD detection sensitivity and false alarm robustness.

It should be noted that the above-mentioned embodiments illustrate rather than limit the invention, and that those skilled in the art will be able to design many alternative embodiments without departing from the scope of the appended claims. It is intended that the following claims cover all possible example embodiments.

In the claims, any reference signs placed between parentheses shall not be construed as limiting the claim. The word "comprising" does not exclude the presence of elements or steps other than those listed in a claim. The indefinite article "a" or "an" preceding an element does not exclude the presence of a plurality of such elements. In the device claim enumerating several means, several of these means may be embodied by one and the same item of hardware. The mere fact that certain measures are recited in mutually different dependent claims does not indicate that a combination of these measures cannot be used to advantage.

What is claimed is:

1. A communication device comprising:
   a main controller configured to control an RF communication of the communication device;
   an antenna coupled to said main controller and driven by said main controller with modulated carrier signal;
   a detector coupled to said main controller and configured to detect a presence of an external communication device and to initiate a wake-up of said main controller in response to said detection; and
   one or more temperature sensors coupled to said detector and configured to detect temperature information of external or nearby circuits of the communication device;
   wherein the detector is configured to detect said presence by detecting a load on an RF interface of the communication device;
   wherein the detector is configured not to initiate said wake-up of said main controller if a difference between a first temperature measurement and a second temperature measurement is above a first temperature threshold or below a second temperature threshold; and
   wherein the detector is configured to initiate said wake-up of said main controller if a difference between said load and a reference load is above a detection threshold and said difference between said first temperature measurement and said second temperature measurement is less than said first temperature threshold and greater than said second temperature threshold;
   wherein the detector is configured not to initiate said wake-up of said main controller includes increasing said detection threshold by a first scaling factor if said difference between said first temperature measurement and said second temperature measurement is above said first temperature threshold.

2. The communication device of claim 1, wherein the detector is configured not to initiate said wake-up of said main controller includes increasing said detection threshold by a second scaling factor if said difference between said first temperature measurement and said second temperature measurement is below said second temperature threshold.

3. The communication device of claim 1, further comprising a non-volatile random-access memory (NVRAM) or a flash memory for storing one or more configuration parameters.

4. The communication device of claim 1, wherein the detector is configured not to initiate said wake-up of said main controller includes detecting a strong temperature increase event if said difference between said first temperature measurement and said second temperature measurement is above said first temperature threshold.

5. The communication device of claim 1, wherein the detector is configured not to initiate said wake-up of said main controller includes detecting a strong temperature decrease event if said difference between said first temperature measurement and said second temperature measurement is below said second temperature threshold.

6. The communication device of claim 1, wherein said communication device is a near field communication, (NFC) device, a radio frequency identification (RFID) device, a mobile device, or a wearable device.

7. The communication device of claim 1, wherein the first temperature threshold is a positive value, and the second temperature threshold is a negative value.

8. A method comprising:
   detecting a load on an RF interface of a communication device;

detecting temperature information of external or nearby circuits of the communication device;
determining whether to initiate a wake-up of a main controller of the communication device in response to said detecting said load and said temperature information;
preventing said wake-up of said main controller if a difference between a first temperature measurement and a second temperature measurement is above a first temperature threshold or below a second temperature threshold; and
initiating said wake-up of said main controller if a difference between said load and a reference load is above a detection threshold and said difference between said first temperature measurement and said second temperature measurement is less than said first temperature threshold and greater than said second temperature threshold;
wherein preventing initiating said wake-up of said main controller includes increasing said detection threshold by a first scaling factor if said difference between said first temperature measurement and said second temperature measurement is above said first temperature threshold.

9. The method of claim 8, wherein preventing initiating said wake-up of said main controller includes increasing said detection threshold by a second scaling factor if said difference between said first temperature measurement and said second temperature measurement is below said second temperature threshold.

10. The method of claim 8, wherein detecting temperature information of external or nearby circuits of the communication device includes detecting a strong temperature increase event if said difference between said first temperature measurement and said second temperature measurement is above said first temperature threshold.

11. The method of claim 8, wherein detecting temperature information of external or nearby circuits of the communication device includes detecting a strong temperature decrease event if said difference between said first temperature measurement and said second temperature measurement is below said second temperature threshold.

12. The method of claim 8, further comprising setting the first temperature threshold to a positive value and the second temperature threshold to a negative value.

13. A communication device comprising:
a main controller configured to control an RF communication of the communication device;
an antenna coupled to said main controller and driven by said main controller with modulated carrier signal;
a detector coupled to said main controller and configured to detect a presence of an external communication device and to initiate a wake-up of said main controller in response to said detection;
one or more temperature sensors configured to detect temperature information of external or nearby circuits of the communication device; and
a temperature compensation tracking module coupled to said one or more temperature sensors and configured to determine an error caused by a temperature change in response to said temperature information;
wherein the detector is configured to detect said presence by detecting a first load on an RF interface of the communication device and deriving a second load by subtracting said error from said first load; and
wherein the detector is configured to initiate said wake-up of said main controller if a difference between said second load and a reference is above a detection threshold.

14. The communication device of claim 13, wherein said temperature compensation tracking module is configured to predict said error based on a difference between a first temperature measurement at a first time instant and a second temperature measurement at a second time instant and one or more configuration parameters.

15. The communication device of claim 14, further comprising a non-volatile random-access memory (NVRAM) for storing said one or more configuration parameters.

16. The communication device of claim 13, wherein said detector is configured to control said temperature compensation tracking module.

17. The communication device of claim 13, wherein said temperature compensation tracking module is configured to determine an error caused by a temperature change includes said temperature compensation tracking module determining an error caused by a strong temperature increase or decrease event if a difference between a first temperature measurement and a second temperature measurement is above a first temperature threshold or below a second temperature threshold.

18. The communication device of claim 13, wherein said communication device is a near field communication, (NFC) device, a radio frequency identification (RFID) device, a mobile device, or a wearable device.

* * * * *